May 11, 1965  G. L. CLAPPER  3,183,303
SYSTEM FOR VOICE ANSWER-BACK FROM DATA PROCESSOR
Filed Dec. 21, 1961  6 Sheets-Sheet 1

FIG.1

INVENTOR.
GENUNG L. CLAPPER
BY
*Sughrue Rothwell Mion & Zinn*
ATTORNEYS

May 11, 1965 G. L. CLAPPER 3,183,303
SYSTEM FOR VOICE ANSWER-BACK FROM DATA PROCESSOR
Filed Dec. 21, 1961 6 Sheets-Sheet 2

May 11, 1965   G. L. CLAPPER   3,183,303
SYSTEM FOR VOICE ANSWER-BACK FROM DATA PROCESSOR
Filed Dec. 21, 1961   6 Sheets-Sheet 5

FIG.6

FIG.8a GATE
FIG.8b HISS
FIG.8c A04
FIG.8d SAWTOOTH
FIG.8e A04

FIG.10 SQUELCH & INTENSITY CONTROL CIRCUITS

FIG.11a GATE
FIG.11b
FIG.11c
FIG.11d
FIG.11e
FIG.11f
FIG.11g

FIG.12

United States Patent Office 3,183,303
Patented May 11, 1965

3,183,303
SYSTEM FOR VOICE ANSWER-BACK FROM DATA PROCESSOR
Genung L. Clapper, Vestal, N.Y., assignor to International Business Machines Corporation, New York, N.Y., a corporation of New York
Filed Dec. 21, 1961, Ser. No. 160,994
1 Claim. (Cl. 179—1)

This invention relates to voice answer-back systems and more particularly to a system for storing coded information that represents audio frequency and intensity and reading out the coded information in a manner that reconstructs desired audio words.

In many data processing systems it is desirable to provide for a voice answer-back in response to a particular coded input. In order to accomplish this, some prior art systems have stored the answer-back words or phrases in audio form and have provided for the playback of these audio words at the desired time. This has not been entirely satisfactory since the storage of words in audio form requires a large amount of storage space. In order to compress the storage required, it is desirable to store only digital numbers representing samples of the desired words. By reading these digital codes out of storage the desired audio answer-back can be reconstructed.

In such answer-back systems it is desirable to build up a complete library of words to be used in replying to inputs to the system. Further, it is desirable to have the equipment necessary to generate the digital codes representing the audio words at a central location. These digital words are punched, for example, on punch cards and the punch cards are assembled into a desired library of words. The punch cards provide a convenient form for transporting the library to remote locations having data processing systems requiring answer-back service. By using these cards, words can be assembled and combined in any form and loaded into a storage device, such as, for example, a magnetic disc. The digital codes stored on the drum are then called up as desired and processed to reconstruct the desired audio answer-back.

In some prior art systems digital codes have been generated representing the time duration as well as the frequency, intensity, and other characteristics of the audio word. In such systems the time duration of the sound is encoded in order to represent a given audio word with the fewest possible number of digital codes. However, including the time duration of an audio sound requires special circuitry. When the digital codes are permanently stored in accordance with a system as outlined above, the necessity of encoding time duration is obviated by a clocking and sampling technique which recreates the time duration information.

Accordingly, it is an object of the present invention to provide an improved voice answer-back system including a storage device for permanently storing digital signals representing audio words and providing circuitry for selectively reading the digital codes out of the storage device in order to reconstruct a desired audio answer.

It is a further object of the present invention to provide an improved voice answer-back system in which the time duration information regarding audio sounds is obtained by periodic sampling of the audio sound.

It is a further object of the present invention to provide an improved voice answer-back system in which storage space is conserved by recording the library of desired audio words in the form of digital signals.

In accordance with one embodiment of the invention, a modified word code generator is used to generate twelve bits of information regarding the frequency and intensity of an audio word. Such a digital code is periodically generated at specific sample times. The digital codes so generated are temporarily stored and are then punched into a punch card. In this manner, one operator who has diction particularly well suited for this purpose, can build up a card file of digital codes representing specific audio words. This card file may be sent to a remote location having a data processing system with answer-back facilities. At the remote location the cards are run through a collator or a sorter in order to assemble a desired message answer. The codes are then loaded into a magnetic disc or other storage device in a normal loading routine. The digital codes are loaded into the magnetic disc just as any other information regarding, for example, payroll or inventory, would be loaded into the magnetic disc. When an input to the data processing system requires a specified audio answer, the data processing system selects a particular track of the disc containing the code representation of the audio answer. The digital codes are read into a twelve-bit buffer from which the bits control ten oscillators and an intensity control circuit which reconstructs the speech represented by the digital code. Each digital code occupies less than one hundred microseconds and the codes are read out at ten millisecond intervals. This results in a reduction in the storage time required of approximately 100 to 1.

The foregoing and other objects, features and advantages of the invention will be apparent from the following more particular description of a preferred embodiment of the invention as illustrated in the accompanying drawings in which:

FIGURE 11b is a waveform of the voltage at the collector of transistor 1201;

FIGURE 11c is a waveform of the voltage at the collector of transistor 1202;

FIGURE 11d is a waveform of the voltage at the base of transistor 1203;

FIGURE 11e is a waveform of the voltage at the collector of transistor 1203;

FIGURE 11f is a waveform of the voltage at the emitter of transistor 1202;

Figure 1:
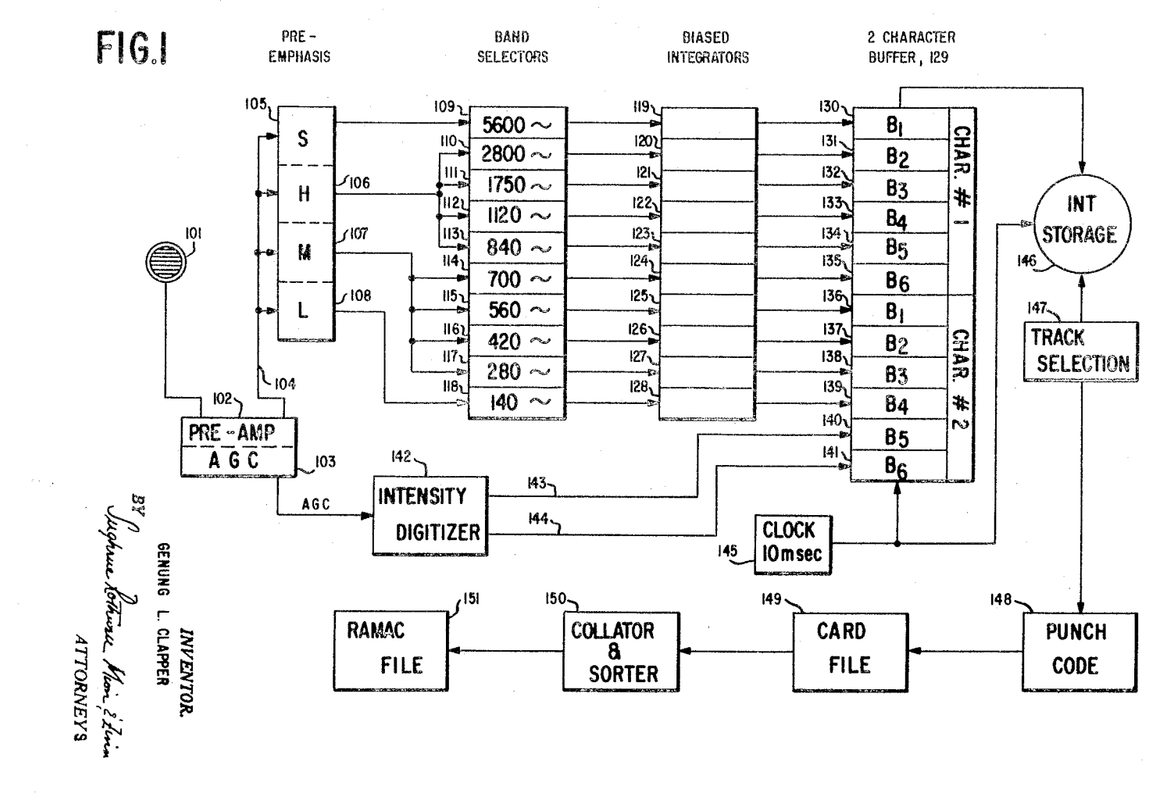
FIGURE 1 shows a block diagram of the word code generator.

FIGURE 1 shows the modified word code generator for translating audio words into a digital form suitable for storage. Input microphone 101 converts sound waves to electrical waves that are amplified by preamplifier 102. The over-all gain of the amplifier 102 is dynamically adjusted by the automatic gain control 103 to hold the preamplifier output 104 constant during speech.

The speech "envelope" is applied to four pre-emphasis amplifiers 105, 106, 107 and 108 having broad band selectivity features. The sibilant pre-emphasis amplifier 105 drives the band selector 109. This filter 109 detects the presence of the noise carrier or "hiss." Selectors 110–118 are special narrow band selectors covering the high, medium and low range. The frequency bands selected are near the following frequencies: 140, 280, 420, 560, 700, 840, 1120, 1750, 2800 and 5600 cycles per second. The six lowest bands are evenly spaced as a function of the frequency; the upper four bands are spaced as a function of the logarithm of the frequency. A greater concentration of bands in the lower frequencies is required for good speech synthesis.

The output of each band selector is connected to an associated one of the biased integrators 119–128. The biased integrators provide a D.C. restoring circuit with an adjustable D.C. bias threshold. The resultant D.C. reference waveform is diode coupled to a special integrating pulse shaper circuit that creates an output that is binary valued. That is, the output of each of the biased integrators 119–128 is off until the input has reached the required amplitude for a certain minimum time. The output will then stay on until the input has fallen below the threshold level for a time. The result is a square wave which denotes the presence or absence of the frequency component in the speech waveform. The outputs of the biased integrators 119–128 control the entry of frequency information into the two-character buffer 129. Since six-bit characters are used in the data processing system, two characters are required to provide all the bit positions needed to specify each audio sample. The two-character buffer 129 provides bit positions 130–135 for the six bits of character #1 and provides bit positions 136–141 for the bit positions of character #2.

Information regarding the intensity of the speech input is inserted into the bit positions 140 and 141 of the two-character buffer 129. The intensity digitizer 142 provides a binary indication of the absolute intensity as a function of the AGC voltage level. A low-pass filter smooths out all minor fluctuations and an analog-to-binary converter produces binary valued outputs on two lines 143 and 144 that are representative of the logarithm of the speech intensity. These binary valued outputs are inserted into the bit positions 140 and 141 of the two-character buffer 129.

The ten frequency bits and the two intensity bits are periodically inserted into the two character buffer 129 under control of the clock 145. This clock generates pulses every ten milliseconds which sample the frequency intensity information and insert this information into the character buffer 129. This clock 145 provides fixed time sampling whereby each sound is coded as to frequency and intensity and read into the two-character buffer 129 every ten milliseconds. The twelve information bits are then stored on a drum or other intermediate storage device 146 until they can be punched into cards in any standard alpha-numeric code. Track selection circuitry 147 is provided to select the drum track and read the codes out to a punch 148 which produces a card file 149 of useful word codes. The codes are now in a form that can be handled by a data processing system. The cards may be sorted, collated and assembled into the final format for loading into the data processor by the collator and sorter 150. The assembled words and phrases are then inserted into file 151 in the normal manner for loading such a file.

Figure 2:
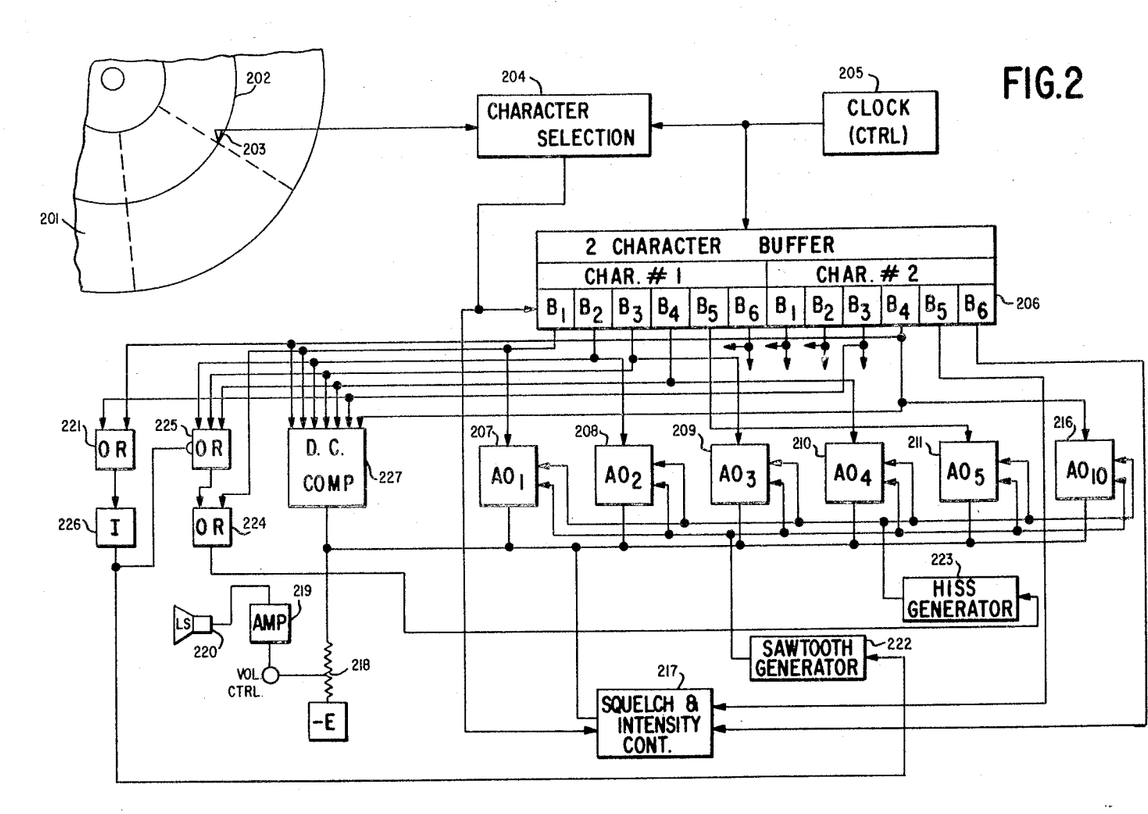
FIGURE 2 shows a block diagram of the storage medium and speech synthesis system.

Each track of the magnetic disc is loaded in accordance with a given routine. The track may contain a given phrase, for example, "This is IBM RAMAC speaking." When this phrase is desired the particular track is selected and character selection circuitry programs the word code characters to read out in the same sequence as the load sequence. Note that since each digital code occupies less than one hundred microseconds and the codes are read out at ten millisecond intervals, a special loading sequence is required. This sequence is as follows: the first two characters are loaded into the first sector, the disc then rotates for ten milliseconds, the time required to rotate through one sector and the next two generated characters are loaded into the second sector; the disc rotates through another sector and the fifth and sixth generated characters are loaded into the third sector; the disc rotates through a sector, the seventh and eighth characters are loaded into the fourth sector; the disc rotates and the ninth and tenth characters are loaded into the fifth sector. The disc now rotates back to the first sector, the disc is precessed by two characters and the eleventh and twelfth generated codes are loaded into the first sector adjacent to the first and second generated codes. The read-out sequence is similar. That is, two characters are read out of a different sector every ten milliseconds.

The characters are read from the magnetic disc into the two-character buffer 206 which has twelve bit positions for the six bits of each of the two words.

The bits stored in the two-character buffer 206 control the oscillators 207–216. (Oscillators 212–215 are not shown.) The ten frequency bits control the gated oscillators 207–216 so that complex speech waveforms are established. The two intensity bits, stored as bits $B_5$ and $B_6$ of character #2 control the Squelch and Intensity controls 217 so as to adjust the output amplitude. The outputs of all oscillators 207–216 are connected through volume control 218 and amplifier 219 to the output loudspeaker 220. The output of Squelch and Intensity controls 217 is also connected to this output circuit so as to adjust the amplitude.

The presence of "voice" is detected by means of OR gate 221 which receives its inputs from the $B_3$ and $B_4$ bits of character #2. Whenever either of these bits are up, there is an indication of a low frequency component of the sound which indicates a "voiced" sound. When this is present, a sawtooth waveform is generated by sawtooth generator 222 which gates the output of the oscillators 207–216 on in a gradual manner which eliminates undesirable "clicking" in the output. If a high frequency "fricative" bit is present or the voice is absent, a noise or sibilant generator 223 is enabled to superimpose a high frequency hiss on the output of the oscillators 207–216. The presence of bit $B_1$ in character #1 by itself acts through OR gate 224 to enable the hiss generator 223. The presence of bits $B_2$, $B_3$ or $B_4$ in character #1 acts through OR gate 225 to enable the hiss generator 223. However, the bits $B_2$, $B_3$ and $B_4$ of character #1 can enable the hiss generator 223 only in the absence of voice. This is detected by inverting the output of OR gate 221 in inverter 226 and using the output of inverter 226 to inhibit the OR gate 225.

Provision is also made for adjusting the D.C. level of the output fed to the loud-speaker 220. D.C. compensation circuitry 227 is provided for this purpose. In the absence of such circuitry, a varying number of frequency bits present in the two-character buffer 206 would cause a varying number of the oscillators 207–216 to be energized. This varying number of energized oscillators would result in a varying D.C. output to amplifier 219. In order to compensate for this, the number of "up" bits among the frequency bits in the two-character buffer 206 are sensed by the D.C. compensation circuitry 227. This circuitry 227 then compensates the D.C. level of the combined output of all oscillators 207–216 to compensate for the varying number of oscillators enabled.

The broad system concepts of this invention have been shown in FIGURES 1 and 2. Many of the circuits utilized in the system are standard circuits as would be required in any system combining audio and digital information. However, some of the circuits which are not standard are shown and described in conjunction with the remainder of the figures in this application.

Figures 3, 4:
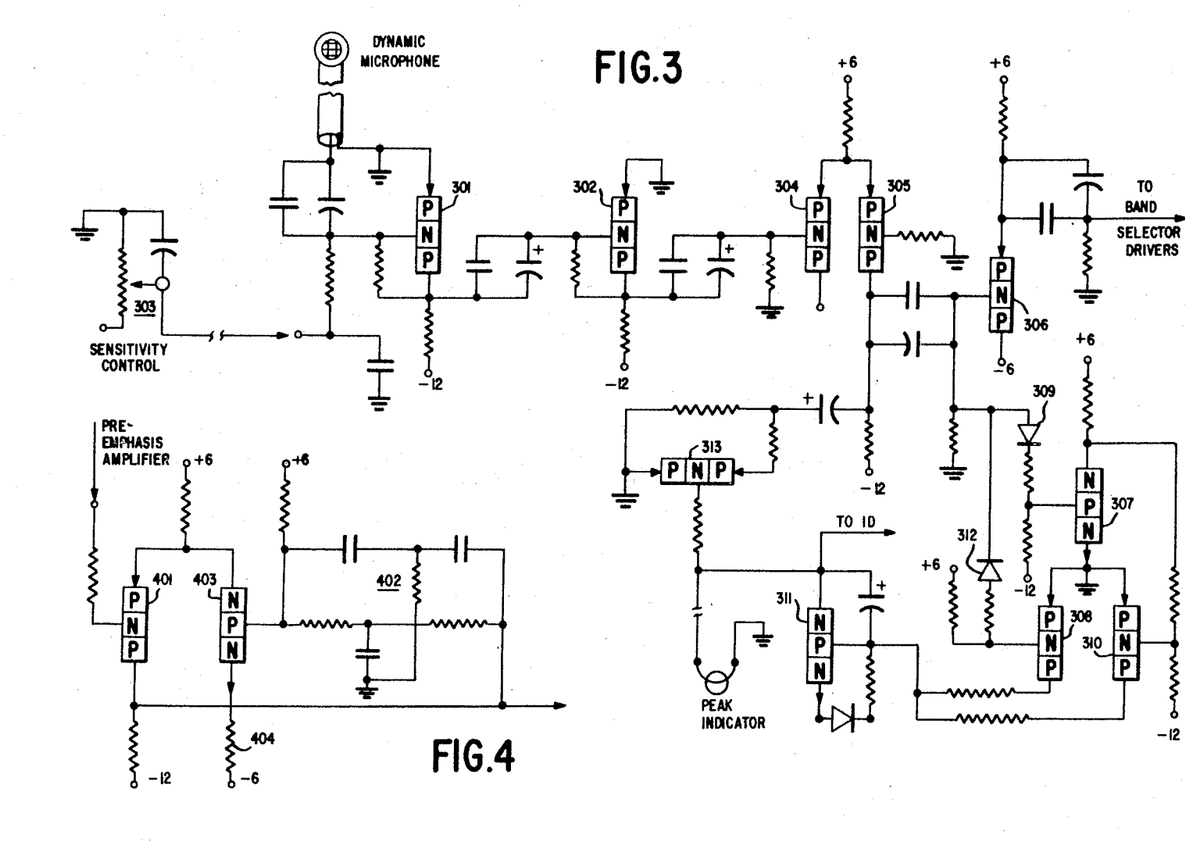
FIGURE 3 is a circuit diagram of the preamplifier and automatic gain control circuits.
FIGURE 4 is a circuit diagram of a band selector.

FIGURE 3 shows the pre-amplifier 102 and associated automatic gain control circuits 103. The microphone pre-amplifier includes a conventional two-stage amplifier including transistors 301 and 302. These two transistors are grounded emitter stages and are capacitively coupled. Internal degenerative feedback is provided. Sensitivity control 303 adjusts the operating point of the transistor 301. The transistor 304 provides an emitter follower output for the second stage amplifier 302. Emitter follower 304 drives the grounded base voltage amplifier 305 which in turn drives the emitter follower output transistor 306.

The automatic gain control circuitry includes transistors 307 and 308. The base-emitter diodes of transistors 307 and 308 are included in the diode clamping circuit for positive and negative peaks, respectively, of the output of the amplifier. Positive peaks in the amplifier output are coupled through diode 309, through the transistor 307, are further amplified by transistor 310, and are applied to the integrator stage 311. Negative peaks are coupled through diode 312, are amplified and inverted in transistor 308 and applied to the integrator stage 311. The output at the collector of transistor 311 is the AGC voltage. This voltage controls the conduction of a bilateral transistor 313 which reflects an impedance to the pre-amplifier output stage which is an inverse function of the AGC voltage. The AGC changes the preamp gain by changing the effective impedance of the output voltage amplifier. This direct method of control provides fast, positive amplitude normalization without overshoot. The AGC voltage from the collector of transistor 311 is also connected to the intensity digitizer 142 shown in block form in FIGURE 1.

Figures 3A, 3B:
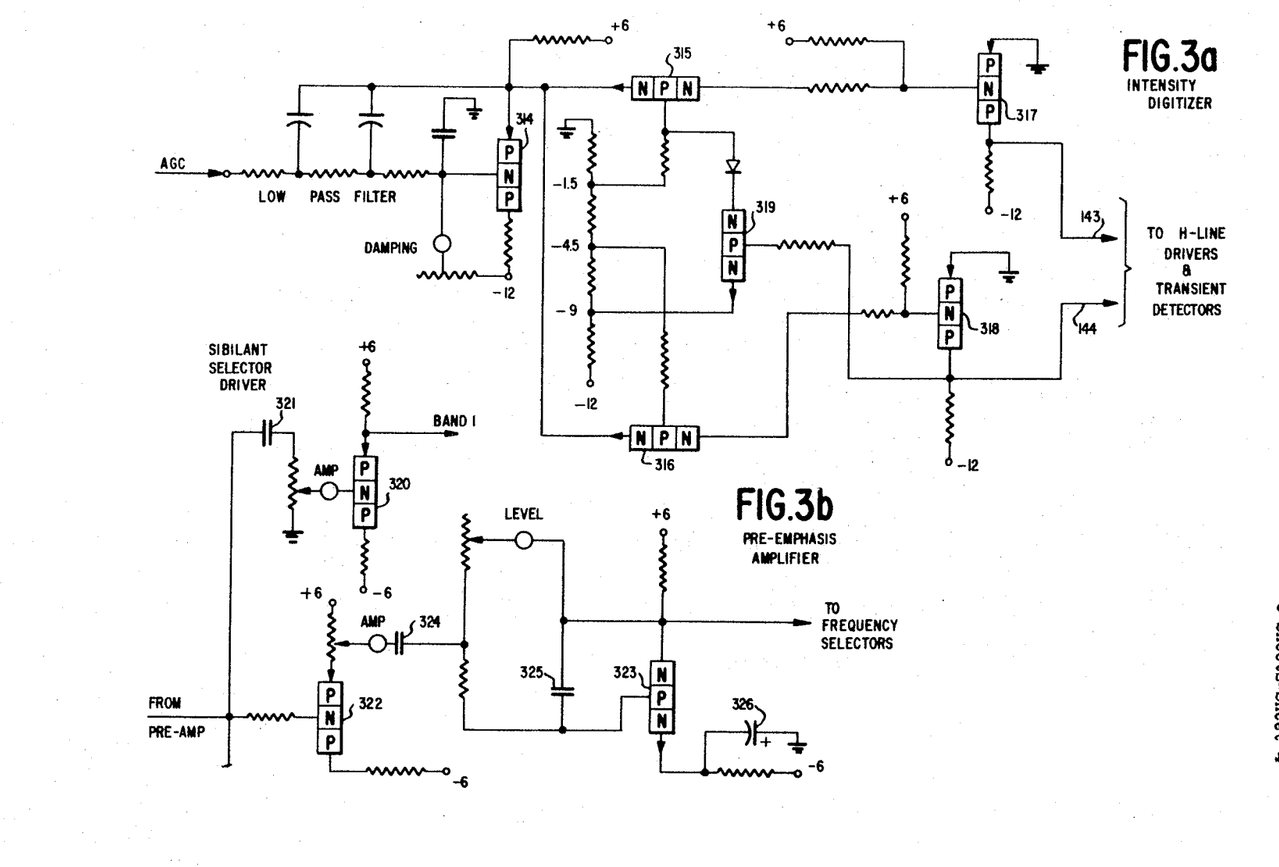
FIGURE 3a is a circuit diagram of the intensity digitizer.
FIGURE 3b is a circuit diagram of the pre-emphasis amplifiers.

The details of the intensity digitizer 142 are shown in FIGURE 3a. The AGC voltage from AGC circuitry 103 is applied through a low-pass filter to the base of emitter follower 314. The output of emitter follower 314 is applied to the emitters of the normally cut off transistors 315 and 316. A voltage of —1.5 volts is normally applied to the base of transistor 315 so that it will conduct only when the voltage applied to the emitter goes more negative than —1.5 volts. A voltage of —4.5 volts is normally applied to the base of transistor 316 so that it will conduct only when the voltage applied to its emitter goes more negative than —4.5 volts. The collectors of transistors 315 and 316 are applied to the bases of output transistors 317 and 318, respectively. The output taken from the collector of transistor 317 corresponds to the output line 143 and the output taken from the collector of transistor 318 corresponds to the output line 144. The collector of transistor 318 is connected to the base of transistor 319. When the transistor 318 conducts, thus driving the collector toward ground potential, the transistor 319 becomes conducting. The collector of transistor 319 is connected through a diode to the base of transistor 315. When transistor 319 conducts, —9 volts is applied to the base of transistor 315. When this condition exists, the transistor 315 is cut off until the voltage at the emitter of transistor 315 exceeds —9 volts.

The code generated by intensity digitizer 142 and its interpretation is shown in the table below:

| AGC | Line 143 | Line 144 | Intensity |
| --- | --- | --- | --- |
| 0 v. to —1.5 v. | 0 | 0 | 0 db to +6 db. |
| —1.5 v. to —4.5 v. | 1 | 0 | +6 db to +12 db. |
| —4.5 v. to —9 v. | 0 | 1 | +12 db to +18 db. |
| —9 v. to —12 v. | 1 | 1 | +18 db and up. |

Circuitry suitable for use as the pre-emphasis amplifiers 105–108 is shown in FIGURE 3b. Pre-emphasis amplifier 105 includes the transistor 320 connected in an emitter follower configuration. The output of preamplifier 102 is connected through the input capacitor 321 to the base of transistor 320. The output is from the emitter of transistor 320 to the band selector 109.

The remainder of the pre-emphasis amplifiers 106, 107 and 108 include two transistor stages. Only the pre-emphasis amplifier 106 is shown in FIGURE 3b but it will be understood that pre-emphasis amplifiers 107 and 108 are similar except that certain of the capacitors differ in value in order to emphasize the desired frequencies. Pre-emphasis amplifier 106 includes the emitter follower stage 322 and the output driver 323. The emitter of transistor 322 is connected through capacitor 324 to the base of output driver 323. A capacitor 325 is connected between the base and collector of transistor 323 and the emitter of transistor 323 is bypassed to ground by capacitor 326. The values of 324, 325 and 326 determine the frequency emphasis of the circuits. As an example, pre-emphasis amplifier 106 includes capacitors 324, 325 and 326 having values of .02 microfarad, .001 microfarad and 5.0 microfarads, respectively. Pre-emphasis amplifier 107 includes capacitors 324, 325 and 326 having values of .12 microfarad, .004 microfarad and 10.0 microfarads, respectively. Pre-emphasis amplifier 108 includes capacitors 324, 325 and 326 having values of 1.5 microfarads, .01 microfarad, and 50.0 microfarads, respectively. The outputs of each of the pre-emphasis amplifiers, taken from the collector of transistor 323, are connected to the associated ones of the band selectors 110–118.

Circuits suitable for use as the band selectors 110-118 are shown in FIGURE 4. The circuit shown in an efficient filter at audio frequencies. The filter shown has a transmission null at a definite frequency and so may be used in the degenerative feedback loop of an audio amplifier to provide a response characteristic which is the inverse of the filter characteristic.

The transistor 401 amplifies the input signal at the null frequency of the Parallel-T network 402. As the signal frequency changes to an off-null condition, the increasing output of the filter is amplified and inverted by transistor 403 and applied degeneratively to the emitter of transistor 401. This results in a linear characteristic which can be controlled by varying the resistor 404 in the emitter circuit of transistor 403. All of the band selectors 110-118 are the same as the circuits shown in FIGURE 4 with the exception that the Parallel-T networks differ for each frequency band and the resistor 404 is changed in value in order to provide the desired frequency band width.

Figure 5:
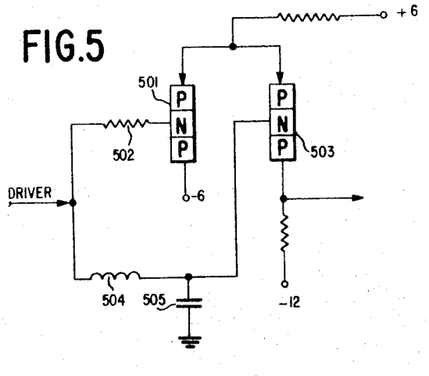
FIGURE 5 is a circuit diagram of the sibilant band selector.

The band selector 109 requires a special design since this filter must have extremely good high frequency response and a sharp attenuation of all frequencies below 4000 cycles. This selector must be capable of selecting sibilant noise. Such a sibilant noise selector is shown in FIGURE 5. The base of transistor 501 is coupled to the input through a low value of resistance 502 so that transistor 501 operates as an emitter follower to transmit both high and low frequency components to the emitter of transistor 503. The input is connected to the base of transistor 503 through a low pass filter including inductor 504 and capacitor 505 so that low frequencies are transmitted and the high frequencies are not passed. The low frequencies are in phase at the base and emitter of transistor 503 so that these are not amplified. High frequencies appearing at the emitter only are highly amplified. For composite waveforms, the low frequencies act as the common mode signal and are rejected while the high frequency noise components are amplified.

Figure 6:
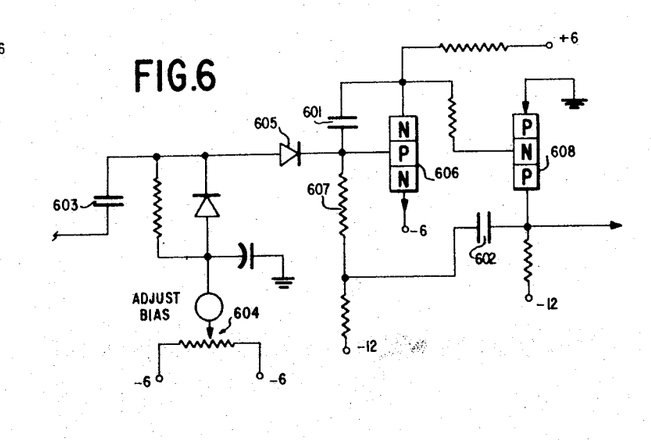
FIGURE 6 is a circuit diagram of the biased integrator.

A circuit suitable for use as one of the biased integrators 119–128 is shown in FIGURE 6. This circuit acts as a decision unit to determine when the energy concentration in a certain frequency band has passed a threshold. It combines an integrating function with a shaping function by the use of two feedback paths. The degenerative path through capacitor 601 is always effective, but it is overridden by the regenerative path from the output through capacitor 602 at those times when the unit responds to a change in the input conditions. The input from one of the band selectors 109–118 is coupled through capacitor 603 to the adjustable bias network 604.

Signals of greater amplitude than the threshold value pass through diode 605 to the base of transistor 606. This places an incremental charge on capacitor 601 and, through the connecting resistor 607, places an incremental charge on capacitor 602. As transistor 606 goes into conduction the negative feedback through capacitor 601 creates the desired integrating action. If the pulses continue to charge capacitors 601 and 602, transistor 606 will eventually conduct sufficiently to remove the positive cut off bias from transistor 608 causing this transistor to conduct. The resultant positive transient on the output is coupled back through capacitor 602 to the base of transistor 606. This action overrides the degenerative feedback and transistors 606 and 608 both conduct strongly to produce a sharp change at the output. After the pulse shaping transient has died out, the integrating action is resumed. When the pulses drop to the amplitude threshold or become less frequent, the voltage at the base of transistor 606 will drop and the collector voltage will rise until transistor 608 begins to cut off. At this time, a negative transient on the output assists the cut off of transisors 606 and 608 and the output pulse is terminated. The output of the shaper is a well-shaped square wave that carries information as to frequency band energy thresholds.

Figure 7:
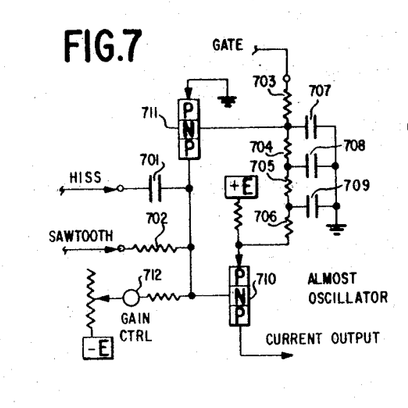
FIGURE 7 is a circuit diagram of a speech synthesizer oscillator.

Referring now to the speech synthesizer of FIGURE 2, a circuit suitable for use as one of the oscillators 207–216 is shown in FIGURE 7. This circuit is designed to oscillate at a fixed frequency when excited by either the sibilant (hiss) noise source, applied to input capacitor 701 or the sawtooth waveform, from sawtooth generator 222, applied to input resistor 702. The gate input to resistor 703 determines whether or not the circuit will oscillate. This input is from one of the bits in the two-character buffer 206. The value of resistors 704–706 and capacitors 707–709 determine the frequency of oscillation of the oscillator.

The oscillator is a modified phase shift oscillator. Transistor 711 operates as a grounded emitter stage with voltage gain. Transistor 710 is a grounded collector stage with power gain but less than unity voltage gain. The gain control adjustment 712 is used to bring the total loop gain to a point just under unity. That is, the voltage gain of transistor 711 just compensates for losses throughout the loop. With this adjustment, the circuit will not oscillate unless energy is supplied from an external source. The gate control applied to the input 703 further reduces the gain of the oscillator loop by changing the D.C. operating point of the transistor 711. Thus, an oscillator that is gated off will not oscillate even with an input. Also, the oscillator will not transmit the input applied to input capacitor 701 or to resistor 702 to the output because of the clamping action of the saturated transistor 711. When the gate applied to point 703 is raised from the off level (−10 volts) to the on level (zero volts), the transistor goes out of saturation and the input signals are transmitted to transistor 710 and back through the phase shift network to the base of transistor 711. The loop is now effective to start the oscillator action since the added energy of the input has been added to the loop gain.

Figure 8A:
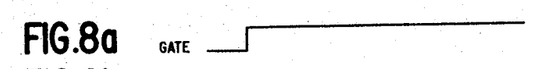
FIGURES 8a–8e show waveforms depicting the operation of the oscillator of FIGURE 7.
Figures 8B, 8C:
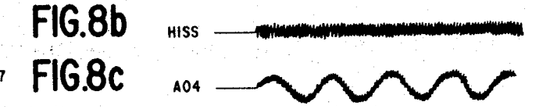

FIGURES 8a, 8b and 8c show waveforms representing the operation of the oscillator of FIGURE 7 when the oscillator is excited by hiss generator 223. FIGURE 8a shows the gate applied to to input resistor 703. FIGURE 8b shows the output of the hiss generator 223 which is turned on by a word code having bits indicating the presence of high frequency sibilant noise. Under these conditions the output of the oscillator, taken from the collector of transistor 710 is as shown in FIGURE 8c.

Figure 8D:
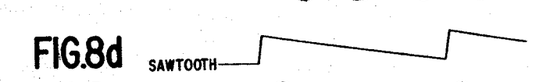
Figure 8E:
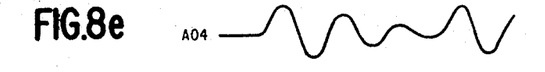

FIGURES 8d and 8e show the waveforms depicting the operation of the oscillator of FIGURE 7 under conditions in which the oscillator is excited by sawtooth generator 222. FIGURE 8d shows the output of sawtooth generator 222 and FIGURE 8e shows the output of the oscillator under these conditions.

Figure 9:
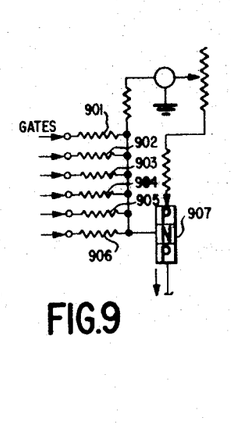
FIGURE 9 is a circuit diagram of the D.C. compensation circuit used in the speech synthesizer.

The D.C. compensation circuit 227 is shown in detail in FIGURE 9. The D.C. compensating network operates to subtract a unit of current for each oscillator gated on, since the change in D.C. operating level to bring an oscillator on results in a change in the D.C. output of the transistor 710 in FIGURE 7. The compensating network shown in FIGURE 9 maintains the D.C. level of the common oscillator output line at a fixed value for any number or combination of oscillators gated on. The lines from the two-character buffer 206 are applied to the input resistors 901–906. Although only six inputs are shown, it will be understood that there is an input for each bit position in the two-character buffer 206. The inputs to these input resistors control the conductivity of transistor 907, the output of which is connected to the volume control circuit 218 in FIGURE 2.

Figure 10:
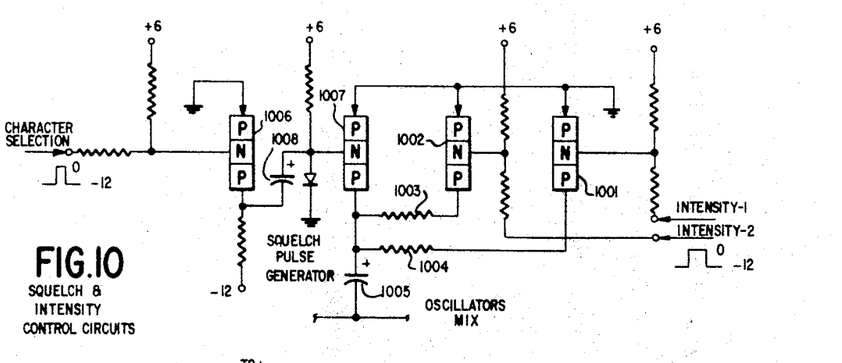
FIGURE 10 is a circuit diagram of the squelch and intensity control circuits.

The details of the Squelch and Intensity controls 217 are shown in FIGURE 10. The two intensity bits stored in buffer 206 are connected to the bases of transistors 1001 and 1002. The two intensity bits control the conducting conditions of transistors 1001 and 1002. The collectors of these transistors are connected through resistors 1003 and 1004 to one side of capacitor 1005. The values of resistors 1003 and 1004 are proportioned in accordance with the intensity specified by the two intensity bits. The junction of resistors 1003 and 1004 is connected to one side of capacitor 1005, the other side of which is connected to the outputs of the oscillators 207–216. The amplitude of the combined outputs of all oscillators will be attenuated in accordance with the conducting conditions of transistors 1001 and 1002. The conducting conditions of these transistors are determined, in turn, by the value of the two intensity bits from the buffer 206.

The squelch control is applied to the outputs of oscillators 207–216 by the transistors 1006 and 1007. As the characters are read out of character selection circuitry 204 to the buffer 206, the characters are also applied to the base of transistor 1006. The collector of transistor 1006 is connected through a capacitor 1008 to the base of transistor 1007. The capacitor differentiates the changes in the character bits, thereby applying a negative-going voltage to the base of transistor 1007. When this occurs, transistor 1007 conducts and applies a squelch control to the outputs of oscillators 207–216.

Figures 11A, 11G:
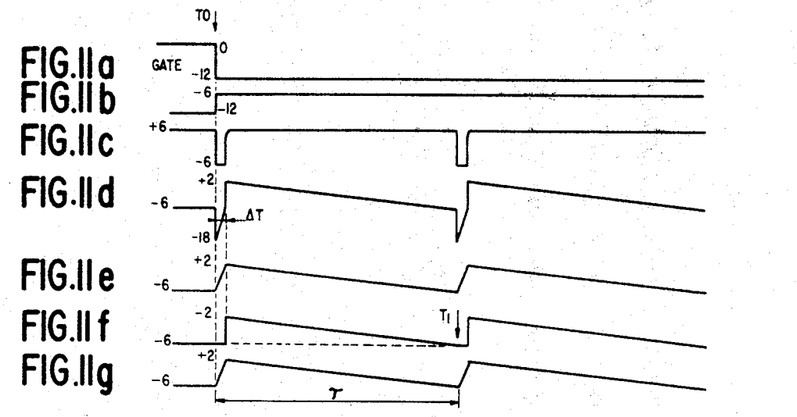
FIGURE 11a is a waveform of the gate applied to the sawtooth generator.
FIGURE 11g is a waveform of the voltage at the emitter of transistor 1205.
Figure 12:
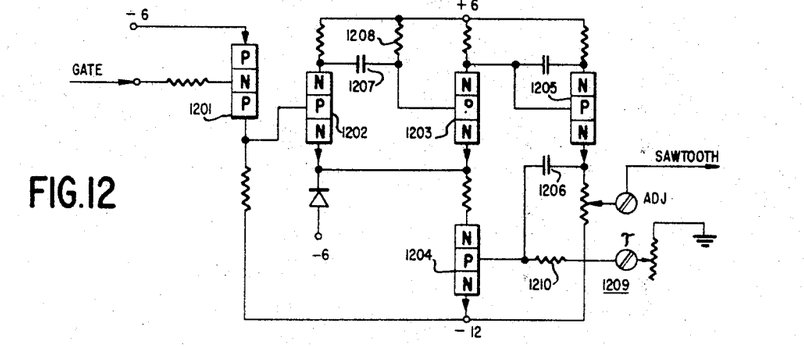
FIGURE 12 is a circuit diagram of the gated sawtooth generator.

The details of the sawtooth generator 222 are shown in FIGURE 12. The waveforms depicting the operation of the sawtooth generator are shown in FIGURES 11a–11g. A negative gate from inhibit circuit 226 is used to start the sawtooth generator. This negative gate is "off" at zero volts and "on" at −12 volts as shown in FIGURE 12a. With the input gate at zero volts, transistor 1201 is cut off because the base is more positive than the emitter which is returned to −6 volts. The collector of trantor 1201 is at −12 volts, as shown in FIGURE 11b, which holds transistor 1202 in the nonconducting condition. With transistor 1202 cut off, the collector is at +6 volts, as shown in FIGURE 11c. Transistors 1203, 1204 and 1205 are conducting and the output is at −6 volts.

The application of a negative gate signal causes the transistor 1201 to conduct. This raises the voltage at the collector of transistor 1201 to −6 volts at which point it is clamped by the conducting transistor as long as the gate is on. This causes transistor 1202 to conduct and the voltage at the collector of this transistor drops sharply from +6 to −6 volts as shown in FIGURE 11c. This negative-going transient is coupled to the base of transistor 1203. The voltage at the base of transistor 1203 drops from −6 volts to approximately −18 volts, as shown in FIGURE 11d, and transistor 1203 is cut off. The collector of transistor 1203 rises toward +6 volts, as shown in FIGURE 11e. This increases the current flowing in the output emitter follower 1205 and the emitter of transistor 1205 begins to rise, as shown in FIGURE 11g. The voltage drop at the collector of transistor 1205 is fed back to the collector of transistor 1203 in a degenerative manner. This controls and linearizes the positive-going waveform. As the emitter of transistor 1205 rises, displacement current flows in the timing capacitor 1206 to the base of transistor 1204. This transistor is already conducting, so no change occurs at this time and the capacitor 1206 is charged as the emitter of transistor 1205 rises and the base of transistor 1204 remains clamped to −12 volts.

During this charging cycle the base of transistor 1203 is rising from −18 volts toward +6 volts as the capacitor 1207 charges through resistor 1208 toward +6 volts. This waveform is shown in FIGURE 11d. The time constants are so arranged that the emitter of transistor 1205 will arrive at about +2 volts when the base of transistor 1203 arrives at −6 volts. When the base of transistor 1203 reaches −6 volts, the charging cycle is terminated and a controlled discharge cycle begins. At this time, the transistor 1203 again begins to conduct. This causes the collector of transistor 1203 to drop in potential and this drop in potential occurs also at the emitter of transistor 1205. Negative displacement current now flows from the emitter of transistor 1205 to the base of transistor 1204, cutting it off. The resultant voltage rise at the emitter of transistor 1202 cuts this transistor off and the collector of transistor 1202 rises toward +6 volts. The resultant positive transient is coupled to the base of transistor 1203 with a resultant rise in the voltage at the emitter of transistor 1203 to about +2 volts. The base of transistor 1203, the collector of transistor 1203, the emitter of transistor 1203, and the emitter of transistor 1205 are now all at about +2 volts and the collector of transistor 1202 is rising to +6 volts. The controlled discharge now begins. With transistor 1202 cut off, transistors 1203, 1204 and 1205 are in a tight degenerative loop. As the emitter of transistor 1205 undergoes a drop in voltage, there is a tendency to cut off transistor 1204 which causes the voltage at the emitters of transistors 1202 and 1203 to rise. The emitter of transistor 1202, the base of transistor 1203, and the collector of transistor 1203 are all coupled together by the saturated transistor 1203. A tendency for the emitter of transistor 1203 to rise will cause the collector of transistor 1203 to tend to rise which will resist the fall in potential at the emitter of transistor 1205. Thus, the drop in potential of the emitter of transistor 1205 is under control of the timing current which flows from ground through the adjustable resistor 1209 and the resistor 1210 to the base of transistor 1204. As the emitter of transistor 1205 falls in a linear fashion, the emitter, base, and collector of transistor 1203 follow.

While there have been shown and described and pointed out the fundamental novel features of the invention as applied to the preferred embodiment, it will be understood that various omissions, substitutions and changes in the form and details of the device illustrated and its operation may be made by those skilled in the art without departing from the spirit of the invention. It is the intention, therefore, to be limited only as indicated by the scope of the following claim.

What is claimed is:

A voice answer-back system comprising an audio input to electrical output transducer, means for periodically sampling said electrical output, means for translating said samples to multiple bit digital codes representing the frequency and intensity of said audio input, means for storing said digital codes, a buffer storage device containing a plurality of bit storage locations equal in number to the number of bits specifying each audio sample, means for sequentially reading said digital codes out of storage in a desired order, means for placing each of said digital codes into said buffer storage device, a plurality of oscillators, certain of the bit storage locations in said buffer storage device being connected to associated ones of said oscillators, each of said oscillators including means responsive to the condition of the bit storage locations connected thereto for enabling said oscillator, the output of each of said oscillators being connected to an audio transducer whereby said audio transducer produces audio sounds synthesized from the outputs of said oscillators, an intensity control circuit, certain of said storage locations in said buffer storage device being connected to said intensity control circuit, said intensity control circuit including means responsive to the conditions of the associated storage locations, said last-named means producing a variable impedance output, said variable impedance output being connected to said audio transducer whereby the amplitude of the audio sound produced varies in accordance with the digital codes stored in said buffer storage device.

References Cited by the Examiner

UNITED STATES PATENTS

| | | | |
|---|---|---|---|
| 3,025,350 | 3/62 | Linder | 179—1 |
| 3,037,076 | 5/62 | Williams et al. | 179—1 |
| 3,037,077 | 5/62 | Williams et al. | 179—1 |

OTHER REFERENCES

"Digital Simulator or Human Communication" by Edward E. David, Jr., Proceedings of the IRE, January 1961, pages 319–329.

"The Use of the IBM 704 in the Simulation of Speech Recognition Systems" by G. L. Schultz, IBM Research Center, Nov. 13, 1959, p. 3.

"Scientific Report No. 1, Design in Study of Correlation Instrumentation for Speech Analysis and Synthesis" by McEvoy et al., July 20, 1961, pages 7 and 8.

ROBERT H. ROSE, *Primary Examiner.*